(12) United States Patent
Wu

(10) Patent No.: US 6,948,671 B2
(45) Date of Patent: Sep. 27, 2005

(54) PEPPER GRINDER OPERABLE WITH ONE HAND AND BY PRESSING AND RELEASING A LEVER REPEATEDLY

(76) Inventor: Ming-Feng Wu, No. 2-1, Shinshin Road, Tainan (TW)

( * ) Notice: Subject to any disclaimer, the term of this patent is extended or adjusted under 35 U.S.C. 154(b) by 0 days.

(21) Appl. No.: 10/736,517

(22) Filed: Dec. 17, 2003

(65) Prior Publication Data

US 2005/0133644 A1 Jun. 23, 2005

(51) Int. Cl.[7] .......................... A01D 34/90; A47J 42/00; A47J 43/00
(52) U.S. Cl. ..................... 241/169.1; 241/168; 241/169
(58) Field of Search ................................ 241/168, 169, 241/169.1

(56) References Cited

U.S. PATENT DOCUMENTS 5,082,190 A * 1/1992 Chen ....................... 241/169.1
6,793,168 B1 * 9/2004 Pedersen ................. 241/169.1

* cited by examiner

Primary Examiner—Derris H. Banks
Assistant Examiner—Jason Y Pahng
(74) Attorney, Agent, or Firm—Rosenberg, Klein & Lee

(57) ABSTRACT

A pepper grinder includes a grinding mechanism, a rotary sleeve, and a depressed sleeve. The rotary sleeve is supported so as to not move down, and joined to an inner wheel of the grinding mechanism with a shaft; the depressed sleeve has several protrusions on an inner side, and is biased upwards by a spring; the rotary sleeve is arranged under, and inserted into the depressed sleeve; the rotary sleeve has spaced spiral-curved guiding grooves on a cylindrical surface, and upright guiding grooves spaced between and connected to the spiral-curved grooves; when the depressed sleeve is not being depressed, the spiral-curved guiding grooves are fitted over upper ends of corresponding protrusions; thus, the inner wheel can be turned relative to an outer wheel for crushing peppercorns when the depressed sleeve is moved up and down repeatedly.

4 Claims, 5 Drawing Sheets

PEPPER GRINDER OPERABLE WITH ONE HAND AND BY PRESSING AND RELEASING A LEVER REPEATEDLY

BACKGROUND OF THE INVENTION

1. Field of the Invention

The present invention relates to a pepper grinder, more particularly one, which is operated by means of pressing and releasing a lever repeatedly with one hand to effect angular displacement of an inner wheel of a grinding unit relative to an outer wheel disposed around the inner wheel.

2. Brief Description of the Prior Art

Referring to FIG. 4, a conventional pepper grinder 2 includes a housing 21, a cover 25, a shaft 24, and a grinding unit, which is comprised of outer and inner wheels 22 and 23.

The shaft 24 is joined to the inner wheel 23 at a lower end, and joined to the cover 25, and screwed into a threaded fixing element 26 at an upper end. The outer wheel 22 of the grinding unit is fixedly disposed in the housing 21. The cover 25 is arranged on top of, and capable of turning on the housing 21 while the inner wheel 23 is held within the outer wheel 22. To put pepper into the grinder, one first has to remove the fixing element 26 and the cover 25. To operate the grinder, one holds the housing 21 with one hand, and turns the cover 25 with the other hand; thus, the inner wheel 23 is turned relative to the outer wheel 22, and pepper held between the wheels 22 and 23 is ground.

However, the above pepper grinder is not very convenient to use because it has to be operated with two hands.

SUMMARY OF THE INVENTION

It is a main object of the present invention to provide a pepper grinder that can be operated with single hand.

The pepper grinder of the present invention includes a housing, a grinding mechanism, a rotary sleeve, a depressed sleeve, and a lever. The housing has a holding room, and a holed transverse support above the holding room. The grinding mechanism includes an outer wheel securely positioned in the holding room, and an inner wheel positioned within the outer wheel. The rotary sleeve is supported on the transverse plate. A shaft is joined to both the rotary sleeve and the inner wheel. The rotary sleeve has spaced spiral-curved guiding grooves on a cylindrical surface thereof, and upright guiding grooves spaced between the spiral-curved guiding grooves; each upright groove is connected to two adjacent spiral-curved guiding grooves at upper and lower ends thereof. The depressed sleeve has several protrusions on an inner side, and is arranged above the rotary sleeve and biased upwards by a spring such that when it is not being depressed, it is fitted over an upper end portion of the rotary sleeve, and the protrusions are fitted in upper ends of corresponding spiral-curved grooves. The lever is pivoted to the housing for depressing the depressed sleeve with. Thus, the inner wheel can be turned in single direction relative to the outer wheel to crush peppercorns between the wheels when the lever is pressed and released repeatedly for the depressed sleeve to move up and down.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
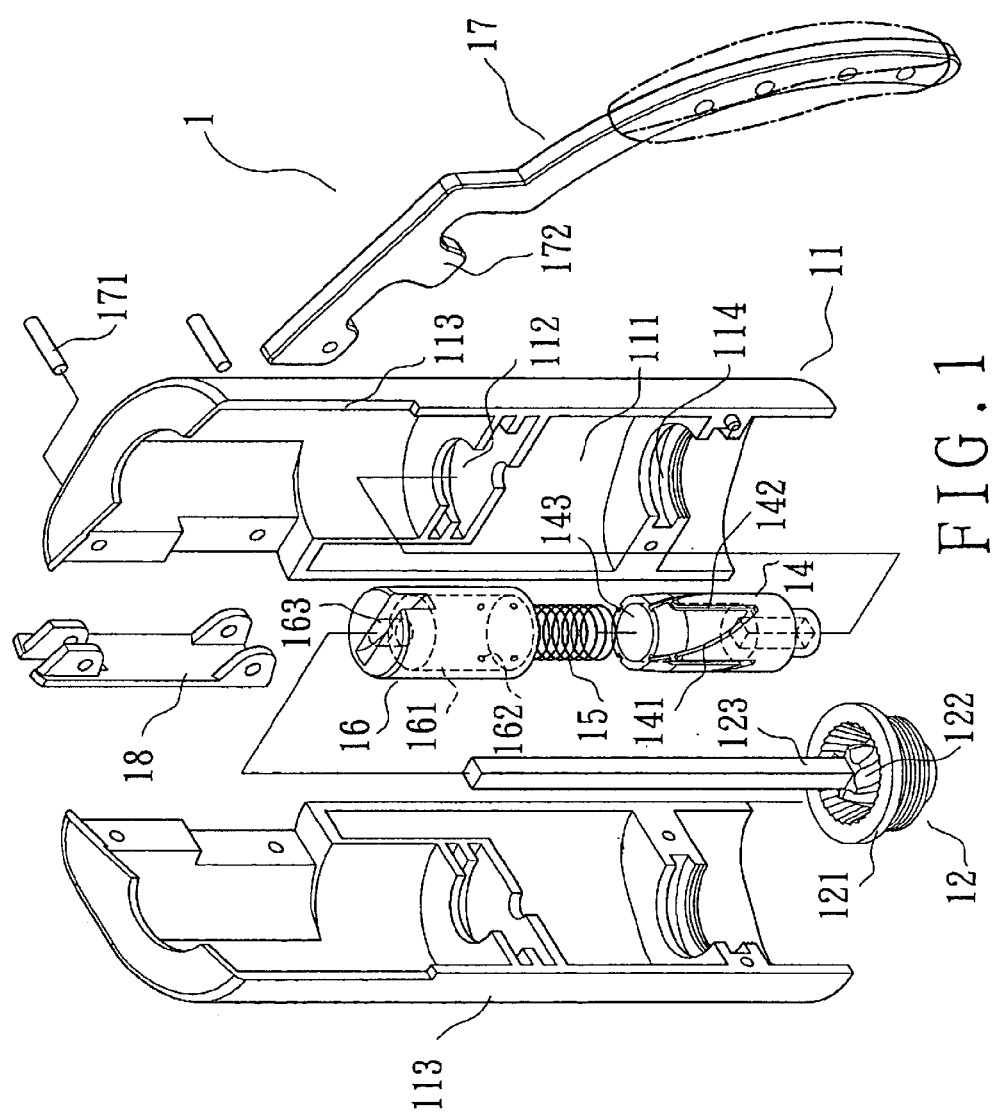
FIG. 1 is an exploded perspective view of the pepper grinder accordingly the present invention.
Figure 2:
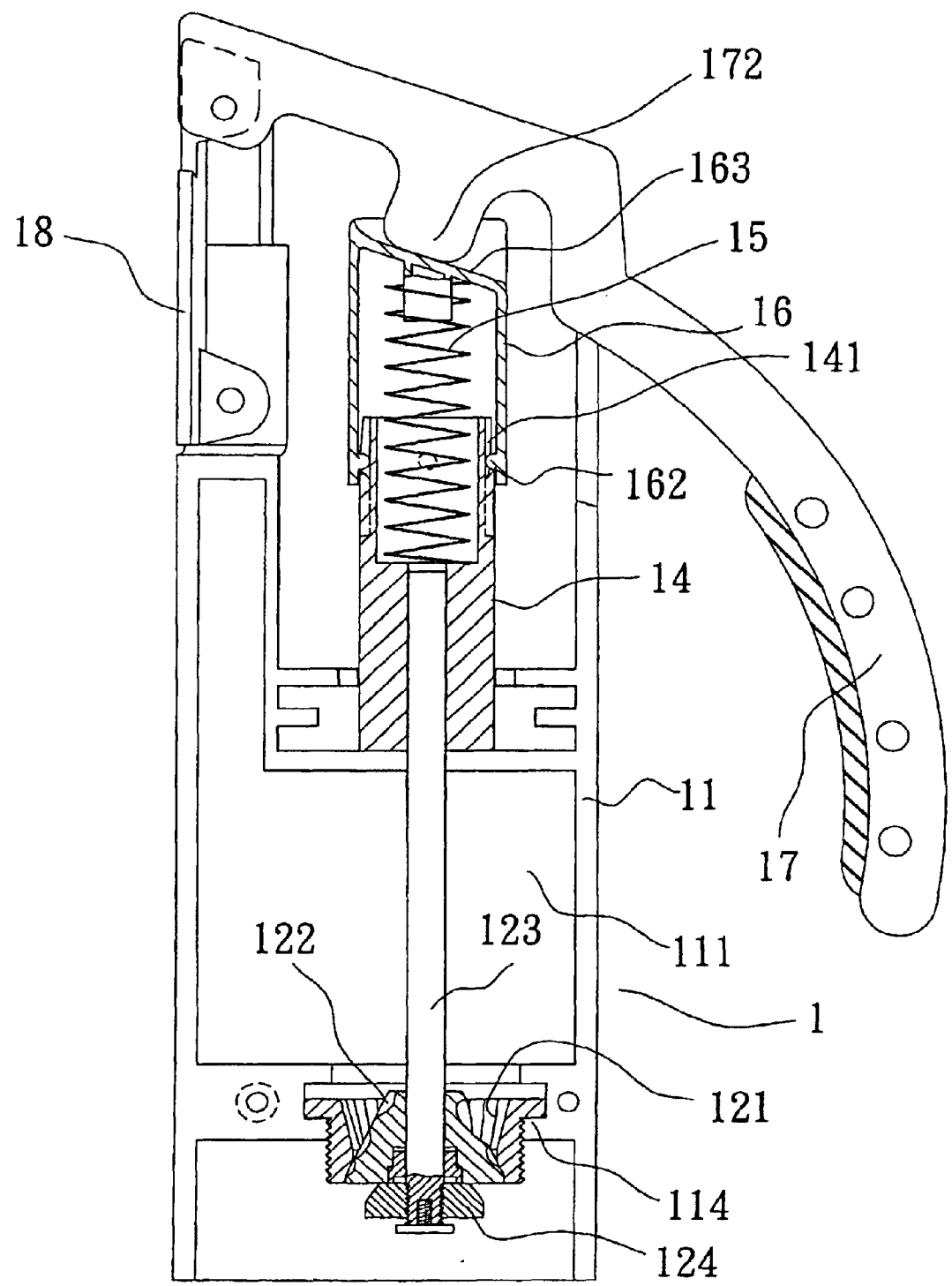
FIG. 2 is a vertical section of the pepper grinder according to the present invention.
Figure 3:
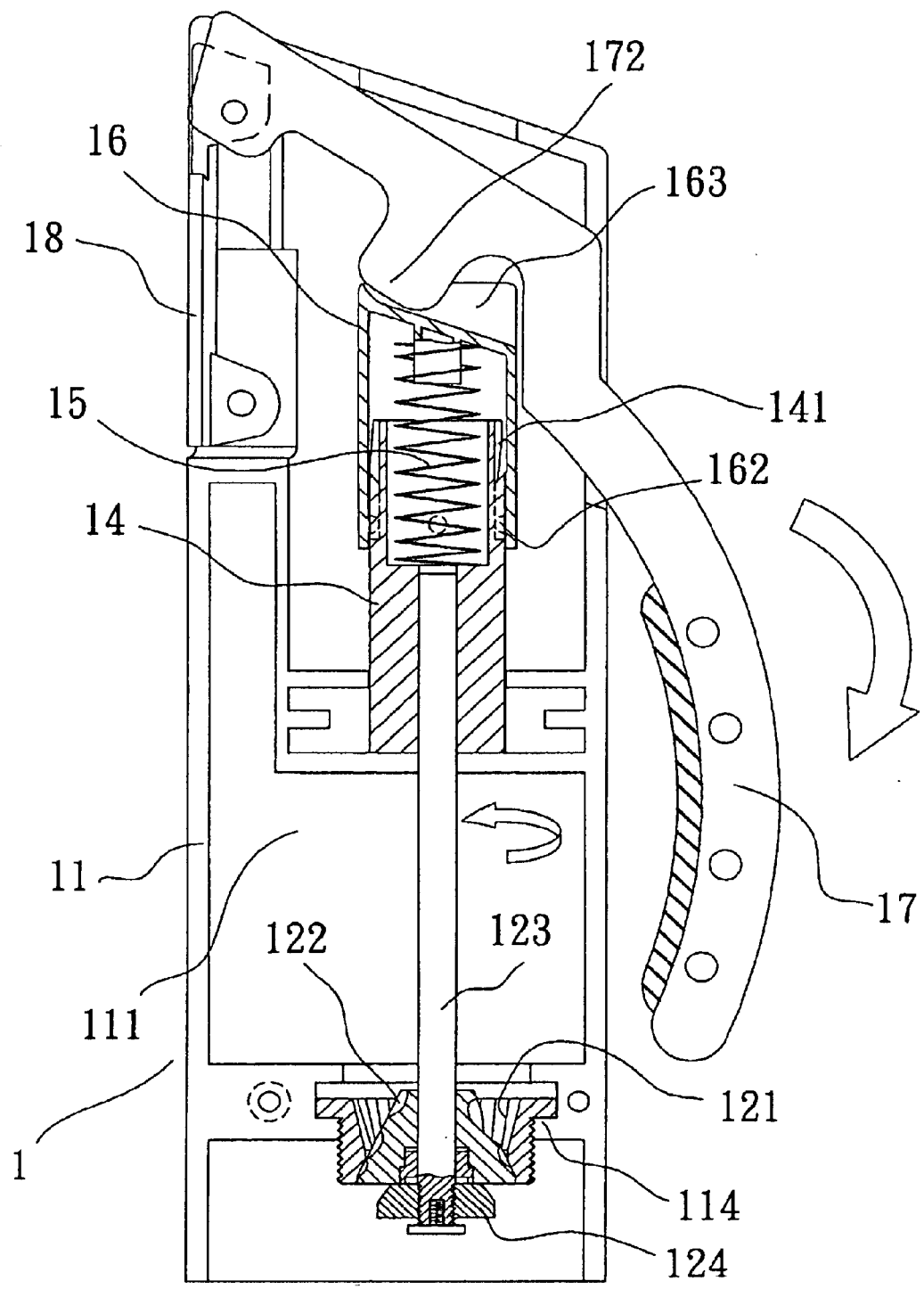
FIG. 3 is a vertical section of the pepper grinder of the present invention in operation.
Figure 4:
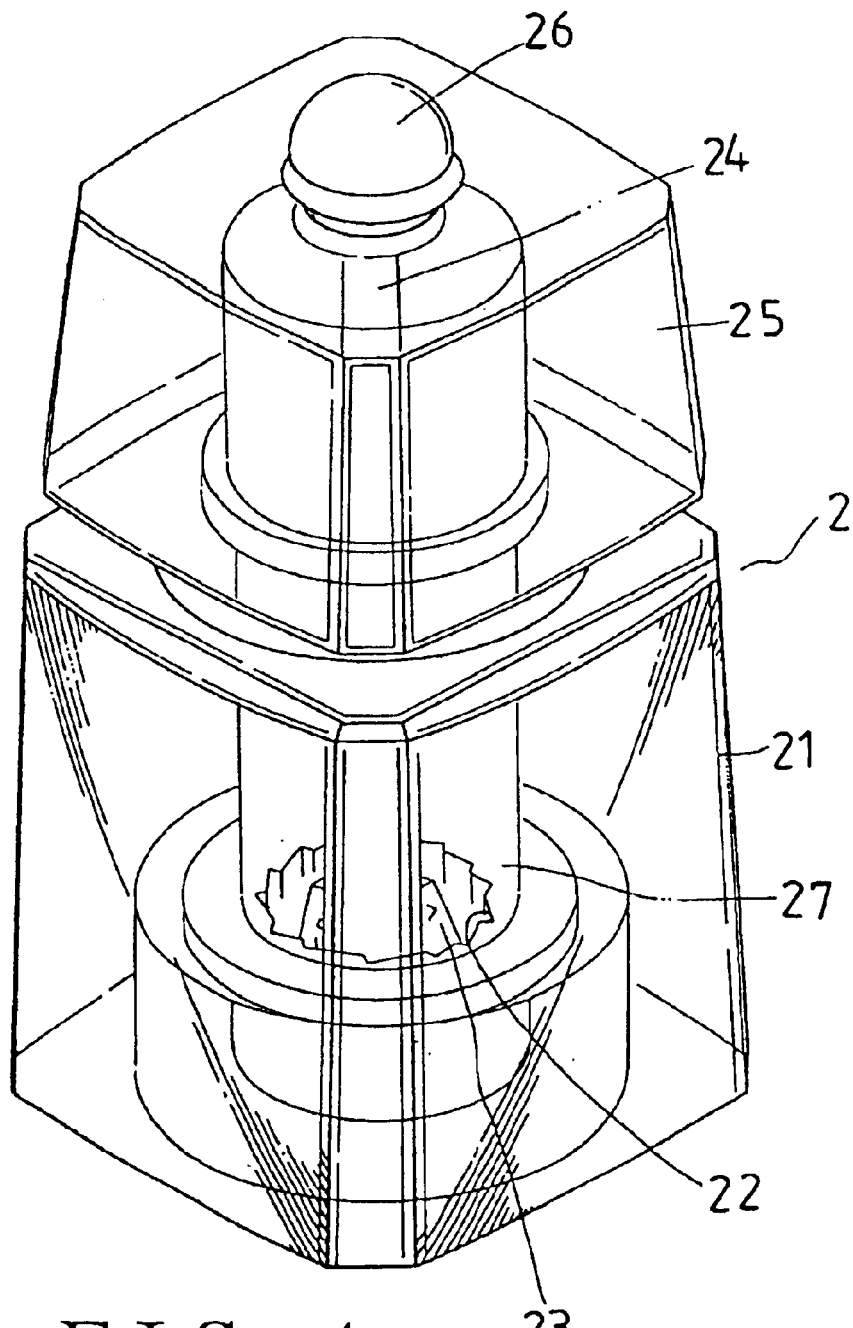
FIG. 4 is a view of the conventional pepper grinder.
Figure 5:
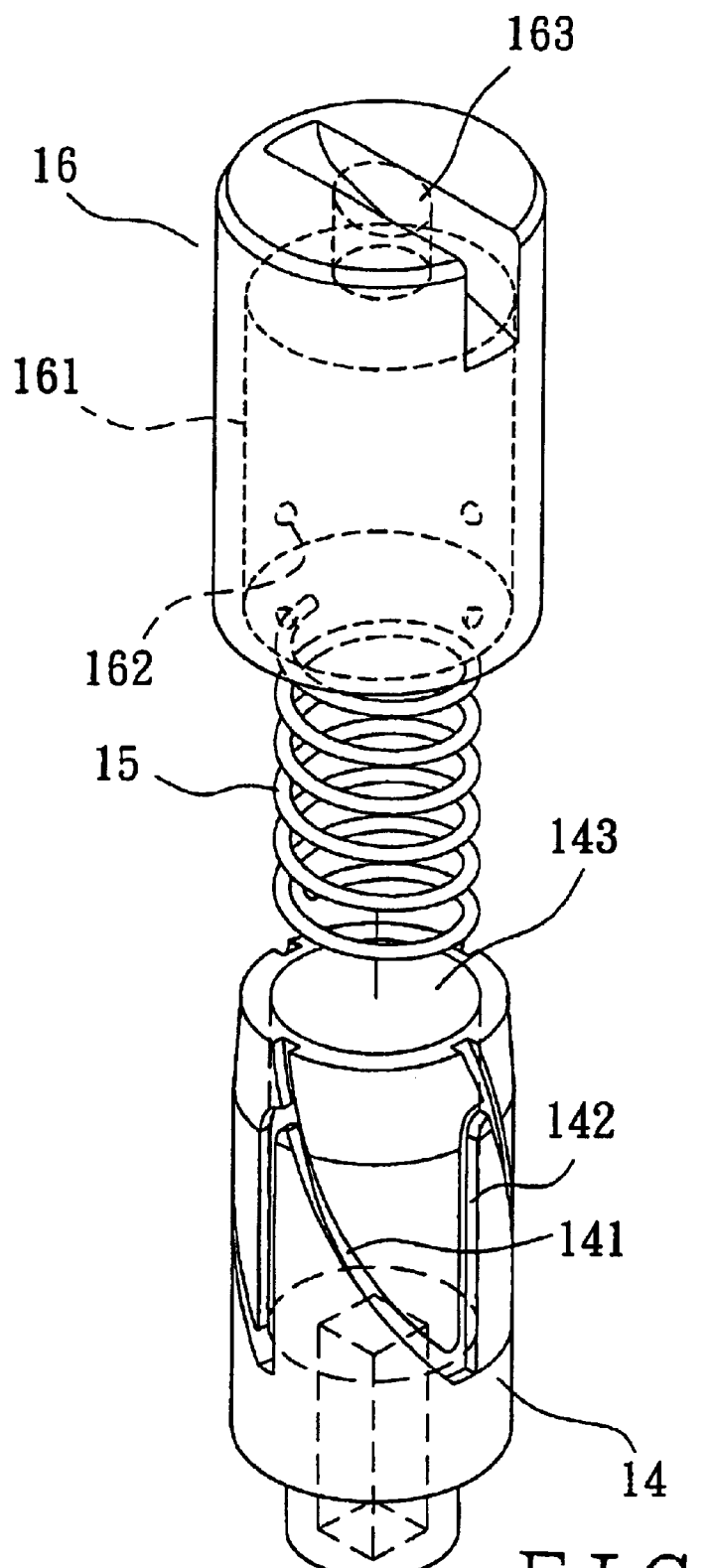
FIG. 5 is an enlarged view of the rotary sleeve shown in the embodiment in FIG. 1.

Referring to FIGS. 1 and 2, a preferred embodiment 1 of a pepper grinder in the present invention includes a housing 11, a grinding mechanism 12, a rotary sleeve, a spring 15, a depressed sleeve 16, and an actuating lever 17.

The housing 11 is comprised of two half parts of the same shape, and has a holding room 111 for holding pepper therein, a transverse support plate 112 above the holding room 111, a slot 113 on an upper portion, and an annular fitting trench 114 on a lower end of the holding room 111. A connecting member 18, on which pivotal holes (not numbered) are formed, is fixedly disposed between the half parts of the housing 11. The transverse support plate 112 has a central hole (not numbered).

The grinding mechanism 12 includes an outer wheel 121, and an inner wheel 122, which is arranged within the outer wheel 121; thus, pepper can be ground between the wheels 121 and 122 when the inner wheel 122 is turned relative to the outer wheel 121. In addition, the inner wheel 122 is formed with a non-circular hole (not numbered) through the center. The outer wheel 121 is securely joined to the annular fitting trench 114 of the housing 11. A shaft 123, which is made to fit the non-circular hole of the inner wheel 122, is passed through the non-circular hole of the inner wheel 122 at a lower portion, and the central hole of the transverse support plate 112 at an upper end. A threaded element 124 is arranged under the inner wheel 122 and screwed onto a lower end of the shaft 123.

The rotary sleeve 14 is formed with several spaced spiral-curved guiding grooves 141, i.e. shaped like one section of a spiral, and upright guiding grooves 142 spaced between the spiral-curved guiding grooves 141 on the cylindrical surface thereof; each upright groove 142 communicates with a lower end of one of the spiral-curved grooves 141 that is adjacent to, and in front of it, and communicates with an upper portion of one of the spiral-curved grooves 141 that is adjacent to, and behind it. In addition, the rotary sleeve 14 has a holding space 143 at an upper end, and a hole (not numbered) at a lower end, which is shaped so as to fit the shaft 123. The rotary sleeve 14 is supported on the transverse support plate 112 while the upper end of the shaft 123 is tightly inserted in the lower hole of the rotary sleeve 14.

The spring 15 is held in the holding space of the rotary sleeve 14 at a lower end.

The depressed sleeve 16 has a cylindrical central hole 161, a top portion over the hole 161, several protrusions 162 equidistantly spaced on the inner side and near the lower end, and a groove 163 on the top portion. The depressed sleeve 16 is positioned over the upper end of the spring 15 to be biased upwards by the same such that when the depressed sleeve 16 is not being depressed, it is fitted over an upper end portion of the rotary sleeve 14, and the protrusions 162 thereof are fitted in upper ends of corresponding spiral-curved guiding grooves 141. Therefore, when the depressed sleeve 16 is depressed, the protrusions 162 will move down along the spiral-curved guiding grooves 141 to angularly displace the rotary sleeve 14, and when the depressed sleeve 16 is released from its lowermost position, the protrusions 162 will move up along the upright guiding grooves 142 and be guided thereby into upper ends of the next spiral-curved grooves 141.

The actuating lever 17 has a hand-operated portion, and a convex contact portion 172, and is pivoted to the connecting member 18 by means of a pivotal rod 171 such that the operated portion thereof projects out of the housing 11 through the slot 113, and such that the convex contact portion 172 thereof is fitted in the groove 163 of the depressed sleeve 16.

Thus, when one holds the housing 11, and presses and releases the lever 17 repeatedly, the depressed sleeve 16 will move up and down repeatedly, and in turns, the inner wheel 122 will turn in single direction together with the rotary sleeve 14. Consequently, peppercorns held in the grinding mechanism 12 are ground between the wheels 121 and 122. Because the convex contact portion 172 of the actuating lever 17 is fitted in the groove 163, the depressed sleeve 16 can't turn when the lever 17 is being pressed.

To put pepper corns into the holding room 111 via the lower end of the housing 11, one first has to put the present pepper grinder up side down, and separate the threaded element 124 from the shaft 123, and draw the shaft 123 out of the housing 11.

From the above description, it can be seen that the pepper grinder of the present invention can be operated with single hand, and is convenient to use.

What is claimed is:

1. A pepper grinder, comprising
    a housing, the housing having a holding room, and a holed transverse support plate above the holding room;
    a grinding mechanism including both an outer wheel securely positioned in a lower end of the holding room of the housing and an angularly displaceable inner wheel positioned within the outer wheel;
    a rotary sleeve positioned above the grinding mechanism and supported on the transverse plate of the housing; the inner wheel being connected with a shaft joined to the rotary sleeve so as to be angularly displaceable together with the rotary sleeve; the rotary sleeve having a plurality of spaced spiral-curved guiding grooves on a cylindrical surface thereof, and upright guiding grooves spaced between the spiral-curved guiding grooves; each upright guiding groove being connected to two adjacent spiral-curved guiding grooves at upper and lower ends thereof; and
    a depressed sleeve positioned above the rotary sleeve for effecting angular displacement of the rotary sleeve; the depressed sleeve having a plurality of protrusions on an inner side; the depressed sleeve being biased upwards by a spring such that when it is not being depressed, it is fitted over an upper end portion of the rotary sleeve, and the protrusions are fitted in upper ends of corresponding spiral-curved guiding grooves;
    thus allowing the inner wheel to be turned in single direction relative to the outer wheel to crush pepper corns between the wheels when the depressed sleeve is moved up and down repeatedly.

2. The pepper grinder as claimed in claim 1, wherein an actuating lever is pivoted to the housing, which lever has an operated portion projecting out from the housing as well as a convex contact portion opposing a top of the depressed sleeve.

3. The pepper grinder as claimed in claim 2, wherein the depressed sleeve has a groove on the top thereof, and the convex contact portion of the actuating lever is fitted in the groove of the depressed sleeve.

4. The pepper grinder as claimed in claim 2, wherein a connecting member is secured to the housing while the handle is pivoted to the connecting member.

* * * * *